(12) United States Patent
Bleicher et al.

(10) Patent No.: US 11,097,391 B2
(45) Date of Patent: Aug. 24, 2021

(54) SPINDLE ARRANGEMENT

(71) Applicant: TECHNISCHE UNIVERSITÄT WIEN, Vienna (AT)

(72) Inventors: Friedrich Bleicher, Vienna (AT); Christoph Habersohn, Vienna (AT); Martin Fuchs, Vienna (AT)

(73) Assignee: TECHNISCHE UNIVERSITÄT WIEN, Vienna (AT)

( * ) Notice: Subject to any disclaimer, the term of this patent is extended or adjusted under 35 U.S.C. 154(b) by 419 days.

(21) Appl. No.: 15/546,781

(22) PCT Filed: Jan. 26, 2016

(86) PCT No.: PCT/EP2016/051579
§ 371 (c)(1),
(2) Date: Jul. 27, 2017

(87) PCT Pub. No.: WO2016/120274
PCT Pub. Date: Aug. 4, 2016

(65) Prior Publication Data
US 2018/0021903 A1    Jan. 25, 2018

(30) Foreign Application Priority Data
Jan. 27, 2015   (DE) ...................... 10 2015 101 167.0

(51) Int. Cl.
*B23Q 11/00*  (2006.01)
*B06B 3/00*  (2006.01)
(Continued)

(52) U.S. Cl.
CPC ............ *B23Q 11/0039* (2013.01); *B06B 3/00* (2013.01); *B23Q 1/4876* (2013.01); *B23Q 5/027* (2013.01);
(Continued)

(58) Field of Classification Search
CPC .. B23Q 11/0039; B23Q 5/10; B23Q 11/0035; B23Q 5/027; B23Q 1/4876;
(Continued)

(56) References Cited

U.S. PATENT DOCUMENTS

| 4,478,293 A | * | 10/1984 | Weilenmann | ........ B25D 17/043 173/162.2 |
| 6,000,310 A | * | 12/1999 | Shilkrut | ............. B23Q 11/0035 173/114 |

(Continued)

FOREIGN PATENT DOCUMENTS

| AT | WO2013142890 | * | 3/2013 | ............. B23B 29/12 |
| AT | WO 2013142890 | * | 3/2013 | ............. B23B 29/12 |

(Continued)

OTHER PUBLICATIONS

May 9, 2016 International Search Report issued in Patent Application No. PCT/EP2016/051579.
(Continued)

*Primary Examiner* — Hemant Desai
*Assistant Examiner* — Christopher Robin Kim
(74) *Attorney, Agent, or Firm* — Oliff PLC (57) ABSTRACT

A spindle arrangement for a machine tool, comprising a spindle for driving a tool and at least one actuator for exciting vibration of the tool, characterized in that the spindle arrangement is provided with a compensation device for at least partly compensating the inertia forces produced by the vibration excitation in the spindle region.

13 Claims, 7 Drawing Sheets

(51) Int. Cl.
  *B23Q 1/48* (2006.01)
  *B23Q 5/027* (2006.01)
  *B23Q 5/10* (2006.01)

(52) U.S. Cl.
  CPC ............ *B23Q 5/10* (2013.01); *B23Q 11/0035* (2013.01); *B23Q 2220/006* (2013.01); *B23Q 2230/004* (2013.01); *B23Q 2705/02* (2013.01)

(58) Field of Classification Search
  CPC .......... B23Q 2705/02; B23Q 2220/006; B23Q 2230/004; B06B 3/00
  USPC ............................................... 173/162.2, 200
  See application file for complete search history.

(56) References Cited

U.S. PATENT DOCUMENTS

| | | | | |
|---|---|---|---|---|
| 7,175,506 | B2 * | 2/2007 | Fiebelkorn | B23B 37/00 451/11 |
| 8,074,734 | B2 * | 12/2011 | Gumpert | B25D 17/24 173/210 |
| 2008/0019782 | A1 * | 1/2008 | Imai | B23B 29/125 407/11 |
| 2010/0158307 | A1 * | 6/2010 | Kubota | B23B 29/125 381/400 |

FOREIGN PATENT DOCUMENTS

| | | | |
|---|---|---|---|
| CN | 107405738 B | 12/2020 | |
| DE | 19810996 A1 | 9/1999 | |
| DE | 102005052721 A1 | 5/2006 | |
| DE | 102007053350 A1 | 5/2009 | |
| DE | 102010040636 A1 | 3/2012 | |
| EP | 0849038 A2 * | 6/1998 | ........... B24B 13/046 |
| EP | 0849038 A2 | 6/1998 | |
| EP | 1669148 A1 | 6/2006 | |
| EP | 2709796 B1 | 9/2014 | |
| WO | 1993/25352 A1 | 12/1993 | |
| WO | 2006/022592 A1 | 3/2006 | |
| WO | 2013/142890 A1 | 10/2013 | |

OTHER PUBLICATIONS

Translation of Aug. 28, 2019 Office Action issued in Chinese Patent Application No. 201680007454.9.
Mar. 5, 2020 Office Action issued in Chinese Patent Application No. 201680007454.9.
Jun. 19, 2020 Office Action issued in European Patent Application No. 16702372.0.
Sep. 25, 2020 Notification on Grant of Patent Right for Invention issued in Chinese Patent Application No. 201680007454.9.
Dec. 22, 2020 Patent Certificate issued in Chinese Patent Application No. 201680007454.9.

* cited by examiner

SPINDLE ARRANGEMENT

The invention relates to a spindle arrangement for a machine tool in accordance with the preamble of claim 1.

Such spindle arrangements are used for the vibration-supporting chipping of work pieces and operate in most cases in the high-frequency range of several kHz, wherein the vibration amplitudes lie in the range of few micrometers. Due to the vibration superposition with the feed during chipping it is as a rule possible to achieve increased productivity by improved chip breaking and favored chip removal, and higher tool service life due to improved supply of cooling lubricant. Moreover, the vibration-superimposed manufacturing enables that work pieces which are difficult to process are chipped by means of standard tools. Such chipping is conventionally only possible with special tools. In this respect, reference is especially made to the processing of carbon-fiber-reinforced polymers (CFRP).

In known solutions for vibration-supported processing the vibrations are coupled in either at the tool side or at the work piece side.

Thus, EP 2 709 796 B1 of the applicant discloses a tool holder provided with a vibration device by which the work piece may be impacted with vibration during processing, wherein this vibration is below the ultrasonic range.

DE 10 2010 048 636 A1 describes a machine tool in which both a work piece holder and a tool holder can be impacted with vibrations in the range of more than 5 kHz via vibration units for vibration-supported processing (hybrid processing).

In WO 2013/142890 A1 of the applicant hybrid processing of work pieces is explained, wherein a tool for chipping a work piece is provided with a vibration device by which the tool blade can be impacted with a vibration in a frequency range below ultrasound. The vibration device is provided with a compensation mass which vibrates equally-opposite to the vibration of the tool blade, so that impulse decoupling takes place and the desired processing frequency is hence adjustable independently of the natural frequency of the device.

The documents WO 2006/0222592 A2 and EP 1 669 148 A1 also describe tool units in which a tool can be impacted with vibrations in the ultrasonic range for the hybrid processing of work pieces.

DE 10 2005 052 721 A1 illustrates a device for the vibration-supported processing of work pieces in which a spindle can be vibrated in the Z direction by means of a mechanical cam drive.

It is a problem with such a solution that, due to the reciprocating movement of the spindle, vibrations may be introduced into the machine structure of the machine tool. Above all in the case of rolling body bearings it is possible that the force portions introduced into the machine structure by such vibrations result in defects and failures. Moreover, the path accuracy of the machine is reduced by the vibrations and hence the positioning error about the axis of movement is increased.

In contrast to this it is an object of the invention to provide a spindle arrangement for a machine tool by which the processing accuracy is improved.

This object is solved by a spindle arrangement with the features of claim 1.

Advantageous further developments of the invention are the subject matters of the subclaims.

In accordance with the invention the spindle arrangement for a machine tool comprises a tool spindle for driving a tool and an actuator or an actuator arrangement for exciting vibration of the tool or the tool spindle. The spindle arrangement is provided with a compensation device for at least partly compensating the inertia forces produced by the vibration excitation in the spindle region.

In other words, this compensation device performs an active impulse decoupling in at least one axis of the machine tool, so that the spindle arrangement, despite the vibration excitation, behaves like a conventional standard spindle to the outside, i.e. to the machine structure. The vibrations acting during the hybrid processing on the tool and the work piece are, due to this impulse decoupling, not introduced into the machine structure, so that this compensating of vibrations relieves the machine structure, on the one hand, and increases the positioning accuracy distinctly over conventional solutions, on the other hand. In addition to the regularly improved process parameters, the service life of the tools is also increased in the case of hybrid chipping.

In a preferred embodiment of the invention the compensation device has a compensation mass which is driven equally-opposite to the vibration transferred to the tool.

Impulse decoupling is optimal if the vibration masses of the spindle of the tool and of the compensation mass, their vibration frequencies and their vibration amplitudes are adapted to each other such that the counter-acting inertia forces substantially neutralize themselves.

In accordance with the invention it is preferred if the oscillation frequency is less than 1 kHz and lies preferably in the range of 200 Hz, for instance. Such vibration frequencies are distinctly below the ultrasonic range and enable the implementation of comparatively large vibration amplitudes in the range of 0.05 mm to 1 mm, preferably in the range of 0.1 mm to 0.5 mm.

In one embodiment of the invention the actuator is designed such that vibration excitation in one, two, or three axes is possible. I.e. different actuators may be provided for the respective vibration impacting.

The device-technological effort for implementing the spindle arrangement is minimal if the actuator also drives the compensation mass. It may be provided in this respect that such compensation mass is only provided in the main axis, usually the Z axis, while no compensation mass is required in the vibration directions in the further axes (X, Y axes).

In one embodiment of the invention the spindle is supported by two bearings enabling the vibration.

For minimizing the vibration mass of the spindle, the device-technological effort may be reduced in that only a rotor of the spindle which drives the tool holder is impacted with the vibration, so that the vibrating mass of the spindle is reduced as compared to the afore-described solution and hence less energy requirement is necessary for the movement and additionally the dynamics of the system are improved.

Preferably, the spindle arrangement is provided with a further bearing which is provided in the coupling region of the spindle and/or the rotor to the actuator.

The afore-mentioned bearings may, for instance, be designed as air bearings or as solid body elements, especially as membrane bearings. It may be sufficient if the air bearing is only provided at the work piece side.

The spindle arrangement can be designed in a very compact manner if also the actuator(s) is/are integrated in a spindle housing of the spindle.

In an embodiment of relatively simple structure the vibration transfer between the actuator and the spindle takes place externally via drive rods.

By a suitable design of the vibrating components, preferably the bearings and the vibration parameters (amplitude, frequency), it is possible to excite the entire spindle system to vibrate in the natural frequency range, so that the energy requirement for vibration production is minimal.

The chipping parameters have to be chosen such that an excitation of the machine structure in its natural frequency is avoided.

The actuators for the vibration excitation may be driven hydraulically, mechanically, or electrically. Basically, any vibration actuators such as they are explained in the initially described state of the art can be used. For the impulse compensation of radial vibrations an annular compensation mass may be provided which is operatively connected to the spindle and which encompasses the spindle and is driven by actuators, preferably two opposite actuators.

Preferred embodiments of the invention are explained in detail in the following by means of schematic drawings. There show.

Figure 1:
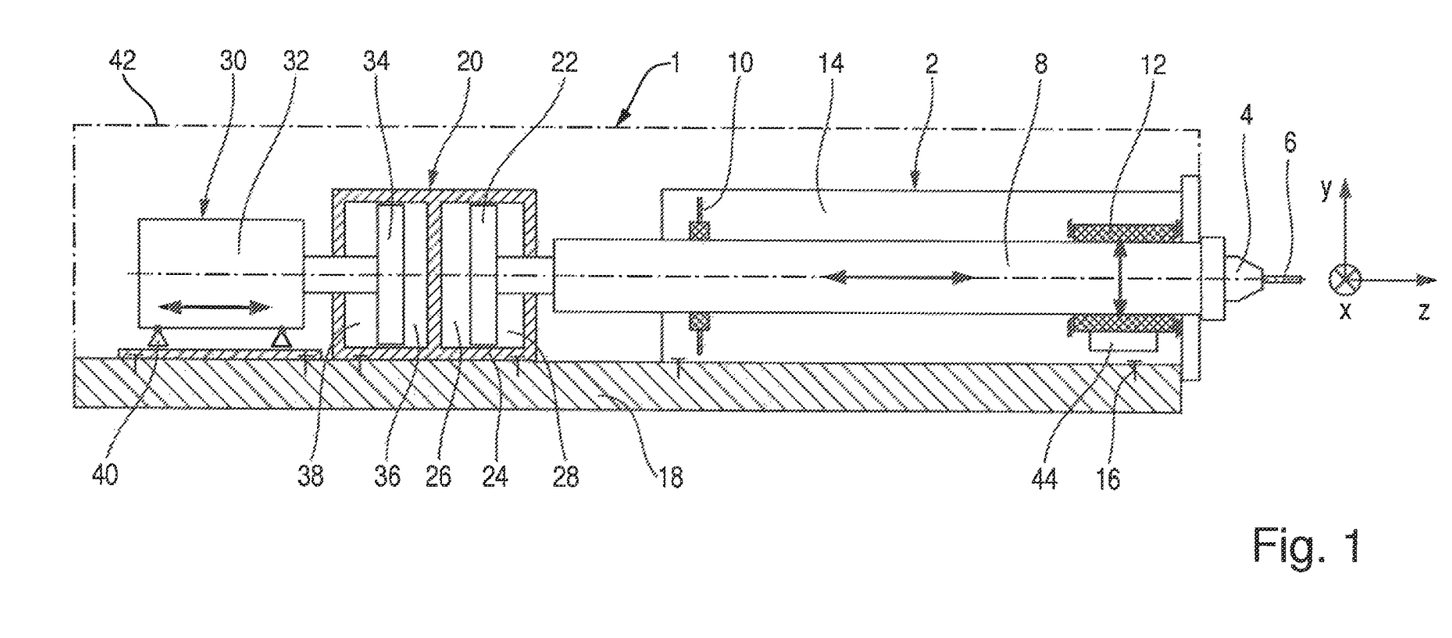
FIG. 1 a schematic diagram of a first embodiment of a spindle arrangement in accordance with the invention with impulse decoupling.

FIG. 1 illustrates a first embodiment of a spindle arrangement 1 of a machine tool which may, for instance, be used for milling, grinding, drilling or some other chipping processing. The spindle arrangement 1 comprises a spindle 2 of a substantially known structure, at which usually a clamping device for a tool holder 4 is formed which carries a tool 6, for example, a milling tool.

The spindle arrangement 1 is guided at a machine structure of the machine tool via suitable linear guides and can be adjusted relative to the processing place at least along the illustrated axes x, y, and z. In the schematic diagram of FIG. 1 an electric drive of the spindle 2 and the cooling lubricant supply of the tool 6 are not illustrated.

A rotor 8 of the spindle which carries the tool holder 4 is mounted in a spindle housing 14 via two spindle bearings. In the illustrated embodiment the spindle bearing shown at the left in FIG. 1 is additionally designed as a solid body element, in the instant case as a membrane bearing 10. The tool side bearing is an air bearing 12. The membrane bearing 10, which will be explained in detail in the following, enables a vibration movement of the rotor in the z direction. The spindle 2 is connected via the spindle housing 14 in a per se known manner by fastening elements 16 with the machine structure 18.

The vibration excitation of the rotor 8 in the z direction is performed by means of an actuator 20 which is designed as a hydraulic actuator in the illustrated embodiment. It is to be understood that other actuators, such as, for instance, electromechanical, pneumatic, or mechanical actuators, may also be used for vibration excitation. In the illustrated embodiment the vibration frequency is relatively low. Preferably, the frequency is intended to lie in the range of less than 1000 Hz, preferably to be approximately 200 Hz. The vibration amplitude that can be produced by the actuator 20 lies preferably in the range between 0.1 mm to 0.5 mm.

In the illustrated embodiment the rotor 8 is extended in the axial direction beyond the spindle housing 14 and is connected with a piston 22 of the actuator 20. The piston 22 is guided in a cylinder housing 24 and forms two pressure chambers 26, 28 therewith, which are alternatingly connectable by non-illustrated servo valves with a pressurizing agent source and a pressurizing agent drain so as to vibrate the rotor 8 as desired. The cylinder housing 24 is fixed to the machine structure 18 coaxially to the spindle 2.

In accordance with the invention the actuator 20 is provided with a compensation device 30. It comprises a compensation mass 32 which is excited to vibrate equally-opposite to the vibration of the rotor 8. In the illustrated embodiment the compensation mass 32 is connected with a balance piston 34 which is also guided in the cylinder housing 24 and confines further pressure chambers 36, 38 therewith, which are also connectable with the pressurizing agent source and/or the pressurizing agent drain. The two adjacent pressure chambers 26, 36 are connected via the servo valves, for instance, simultaneously with the pressurizing agent source while the pressure chambers 28, 38 positioned outside in the cylinder housing 24 are simultaneously relieved by the servo valves toward the pressurizing agent drain, so that the compensation mass and the spindle 8 vibrate equally-opposite. The vibration mass of the compensation mass 32 and that of the spindle are adapted to each other, so that an active impulse decoupling takes place in the case of equal vibration frequency.

Due to this neutralization of the inertia forces of the spindle 2, or more exactly the rotor 8, the vibrations are introduced by the tool 6 alone into the non-illustrated work piece, and not into the machine structure 18.

The compensation mass 32 is guided in a suitable manner via a differential bearing 40 permitting a vibration in the z direction. The entire spindle arrangement 1 may then be covered toward the outside by a cover 42.

It is to be understood that this spindle arrangement 1 may also be arranged in a common housing which is then fastened to the machine structure, for instance, to the machine bed. In some deviation from the concept illustrated in FIG. 1 it is preferred if the actuator 20 is integrated along with the compensation device 30 in the spindle housing 14, wherein the dimensions should not be distinctly above that of a standard spindle. This means that the incorporated spindle arrangement behaves to the outside like a standard spindle, wherein due to the impulse decouplings no vibrations are introduced into the machine structure.

The vibration excitation in the radial direction is performed by suitable further actuators 44. The control of the spindle arrangement 8 is designed such that—depending on the manufacturing instruction—a vibration may take place in different axial directions or in combinations of these axial directions. Basically, impulse compensation is also possible in the radial vibration. Thus, in the region of the actuator 44 an annular mass might, for instance, be provided via which the impulse compensation movement takes place. This mass may enclose the spindle concentrically, wherein this mass may then be assigned to two diametrically arranged actuators, for instance, by which the annular mass is moved relative to the spindle.

Figure 2:
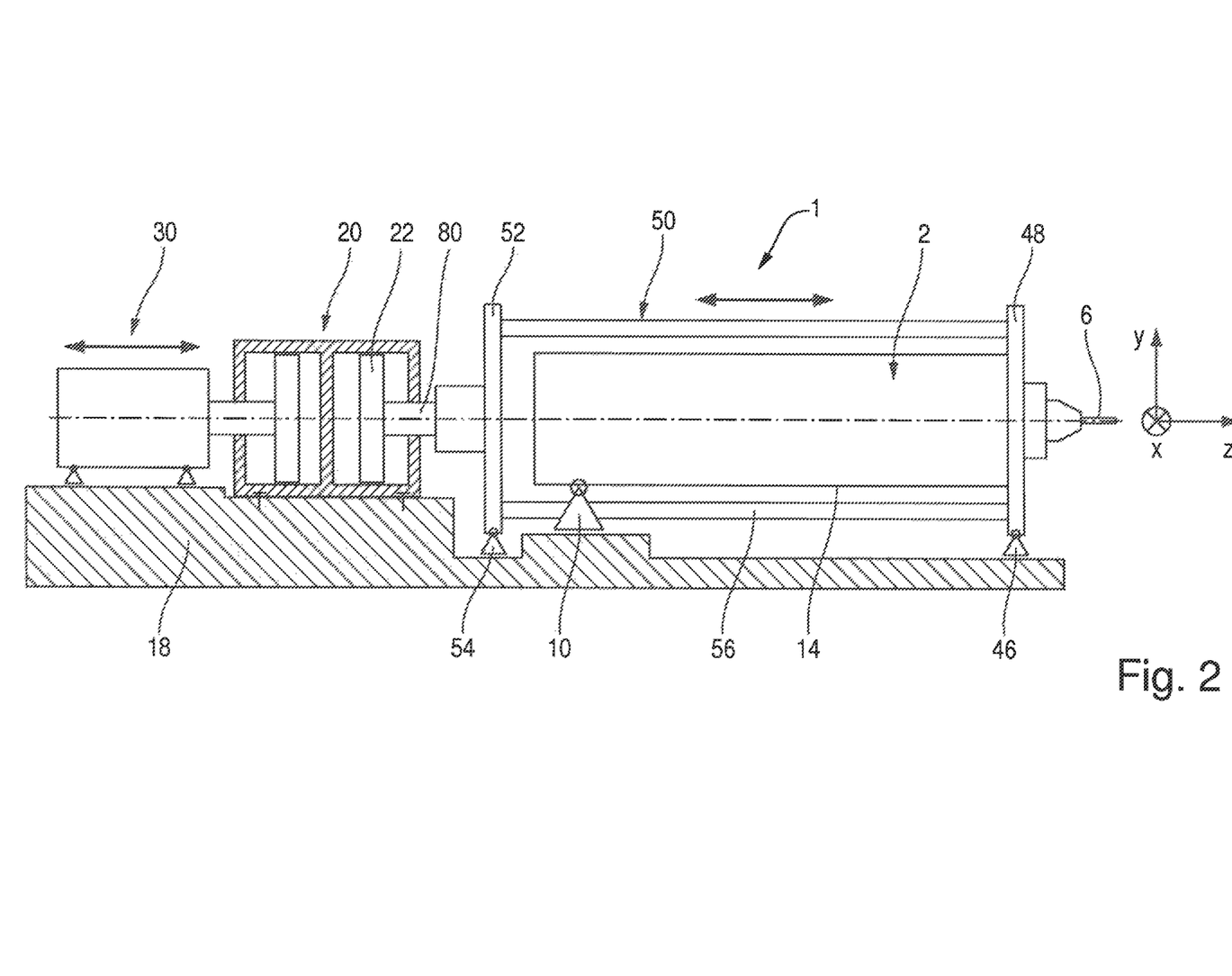
FIG. 2 a variant of the embodiment of FIG. 1.

FIG. 2 shows a somewhat simplified embodiment in which the entire spindle 2 is excited to vibrate. The vibration excitation takes only place in the z direction—a radial vibration excitation is not provided for.

The illustrated embodiment is basically a standard spindle which is mounted on the machine structure 18 via two spindle bearings, in the instant case two membrane bearings 10, 46. These membrane bearings 10, 46 permit a vibration of the spindle 2 in the z direction. The use of a standard spindle 2 indeed reduces the device technological effort, but has the disadvantage over the initially described solution that the vibrating mass is distinctly larger than in the embodiment pursuant to FIG. 1, so that the energy requirement for producing the vibration is correspondingly large and the inertia forces to be compensated are also increased.

Nevertheless, it may be sufficient for simpler manufacturing objects to design the spindle arrangement 1 in accordance with FIG. 2. The spindle 2 is provided with a front flange 48 at the tool side, said front flange 48 being connected through drive rods 50 with a rear side flange 52 which is in turn guided via a further bearing, in the instant case also a membrane bearing 54, at the machine structure 18. This flange 52 is in connection with the piston 22 of the actuator 20, so that the vibrations produced thereby are transferred to the spindle 2 via the flange 52, the drive rods 50, and the front flange 48.

The compensation of the inertia forces is again performed by a compensation device 30. The basic structure of the actuator 20 and of the compensation device 30 corresponds to that of FIG. 1, so that reference is made to this description with respect to the structure. The drive rods 50 have a plurality of transmission bars 56 which extend between the flanges 48, 52 in a parallel distance to the spindle axis and to the spindle housing 14.

Figure 3:
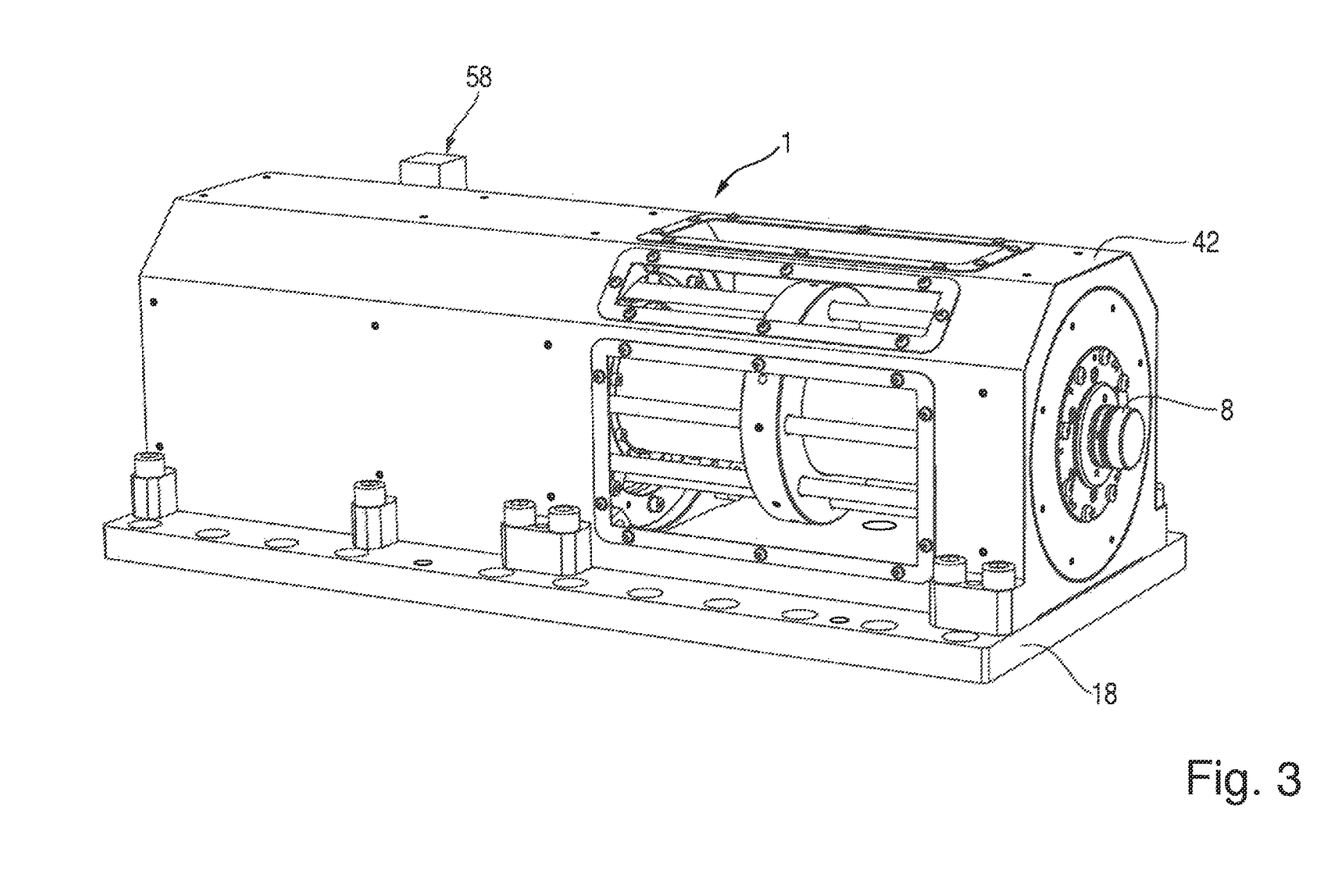
FIG. 3 a concrete solution of the embodiment of FIG. 2.

By means of FIGS. 3 to 7 the basic structure of the spindle arrangement 1 is explained, wherein for the sake of convenience the part concerning the compensation device 30 is not illustrated. FIG. 3 shows the spindle arrangement 1 in the assembly state, wherein the actual spindle is covered by the cover 42. The spindle arrangement 1 is screwed to the implied machine structure 18. In this illustration no tool holder 4 has been mounted to the projecting part of the rotor 8 yet. A part of a control block 58 in which the servo valves for triggering the actuator 20 and the compensation device 30 are integrated, is also implied in FIG. 3.

Figure 4:
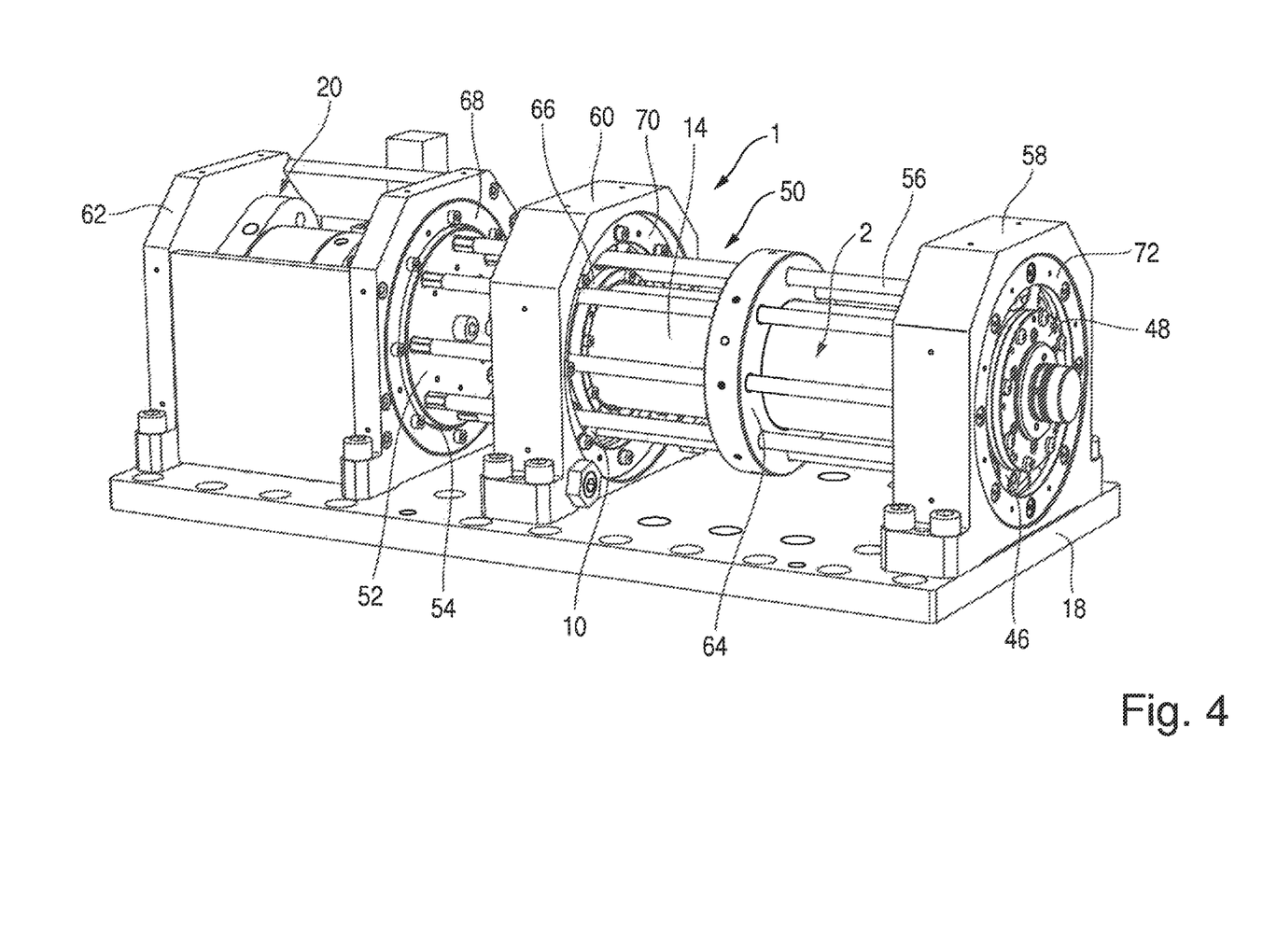
FIG. 4 the spindle arrangement of FIG. 3 with the protective cover removed.

FIG. 4 shows the spindle arrangement 1 with the cover 42 removed. In this illustration one recognizes the spindle 2 which is designed as a standard spindle and which is fixed to the machine structure 18 via two bearing brackets 58, 60.

The spindle 2 is connected with the actuator 20 and the compensation device (not illustrated) in the manner explained by means of FIG. 2. The latter is arranged in an enclosure 62 to which the flange 52 is also fastened.

As explained before, this flange 52 is connected through the drive rods 50 with the transmission bars 56 to the tool side front flange 48. On the other hand, the front flange 52 is in operative connection with the hydraulic actuator 20. In accordance with FIG. 4 the drive bars 56 encompassing the spindle 2 penetrate a guide ring 64 encompassing the housing 14 of the spindle 2.

The spindle is mounted via suitable bearings, in the instant case the two membrane bearings 10, 46, in the two bearing brackets 58, 60 which are connected to the machine structure 18, said membrane bearings 10, 46 being connected with the spindle 2 in the region of the front flange 48 and/or a further spindle flange 66.

The mounting of the actuator-side flange 52 in the enclosure 62 is performed via the above-described further membrane bearing 54 which is, in the illustration of FIG. 4, largely covered by a fastening ring 68.

The fixing of the membrane bearings 46, 10 in the bearing brackets 58 and/or 60 takes place via similar fastening rings 70, 72. The membrane bearings 10, 46, 54 permit—as explained—a vibration movement in the z direction, but are designed to be extremely rigid in the radial direction, so that the path accuracy of the machine tool is not impaired.

Further details will be explained by means of FIGS. 5 to 7.

Figure 5:
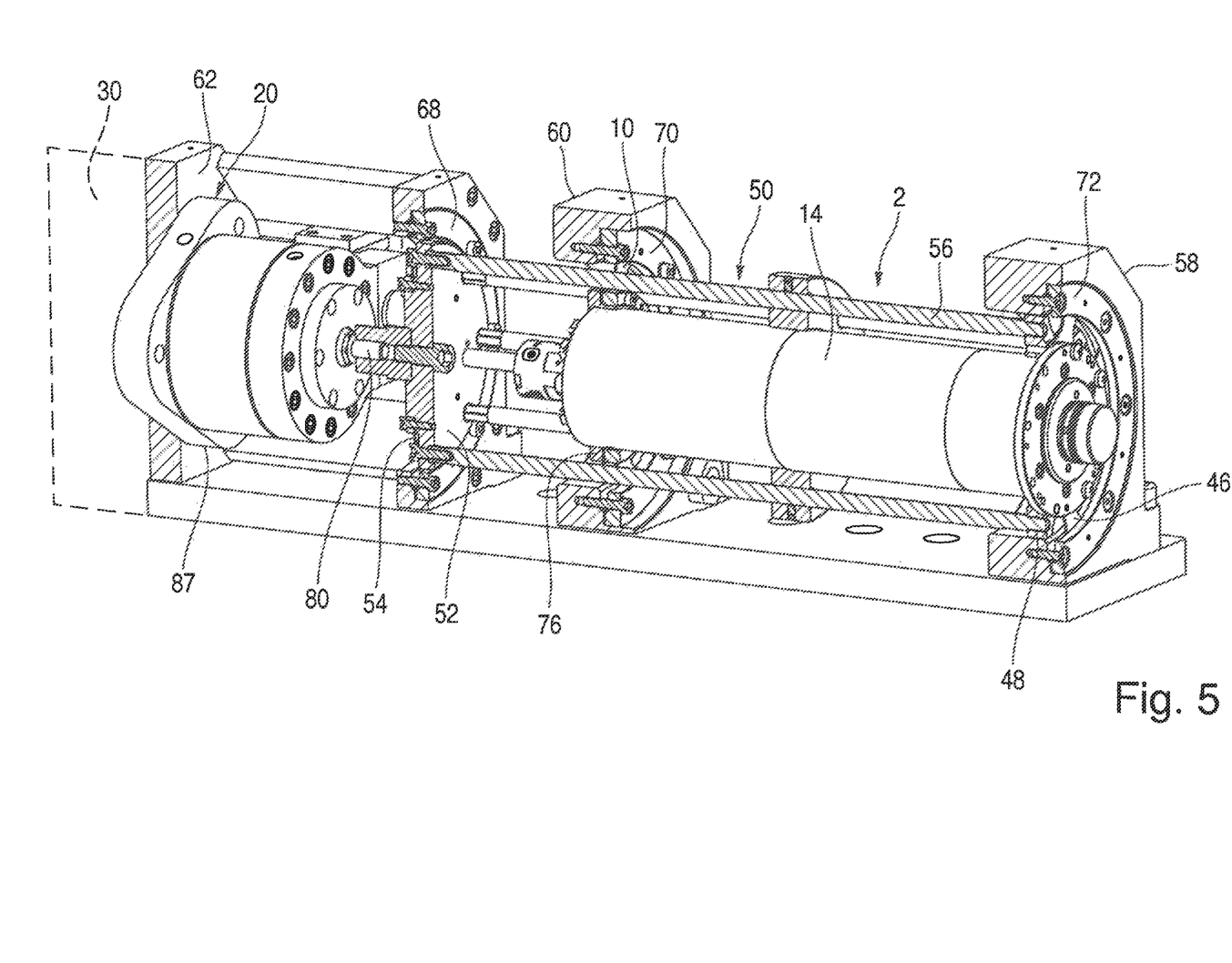
FIG. 5 a simplified sectional view of the spindle arrangement of FIG. 4.

FIG. 5 illustrates a longitudinal section through the spindle arrangement 1 of FIG. 4. Accordingly, the actual spindle 2 has a substantially conventional structure. Since such a spindle structure is basically known, a further explanation may be omitted by referring to the appropriate technical literature.

In the region of the two bearing brackets 58, 60 a fastening flange 76 and/or the front flange 48 is provided at the outer circumference of the spindle housing 14, by which the respective annular inner part of the respective membrane bearings 10, 46 is clamped. The further membrane bearing 54 is connected with its annular inner part to a corresponding receptacle of the flange 52. An external ring of the membrane bearings 54, 10, 46 is then connected with the enclosure 62 of the hydraulic actuator 20 and/or the bearing brackets 60, 58 by means of the fastening rings 68, 70, 72, so that the spindle 2 is exactly guided in the radial direction and a vibration in the z direction is possible.

As explained, in the illustrated embodiment the actuator 20 is operated hydraulically. A piston rod 80 (see also FIG. 2) of a piston of the actuator is connected with the flange 52, so that the vibrations produced via the actuator 20 are transferred to the spindle housing 14 through the drive rods 50 with the transmission bars 56 and the front flange 48. As is indicated in dashes in FIG. 5, the actuator 20 is in operative connection with the compensation device 30, so that an active impulse compensation and hence a compensation of the inertia forces introduced by the vibration of the spindle 2 is possible. In the embodiment pursuant to FIG. 5 the hydraulic actuator 20 is screwed to the enclosure 62 via a console 87 in the z direction.

Figure 6:
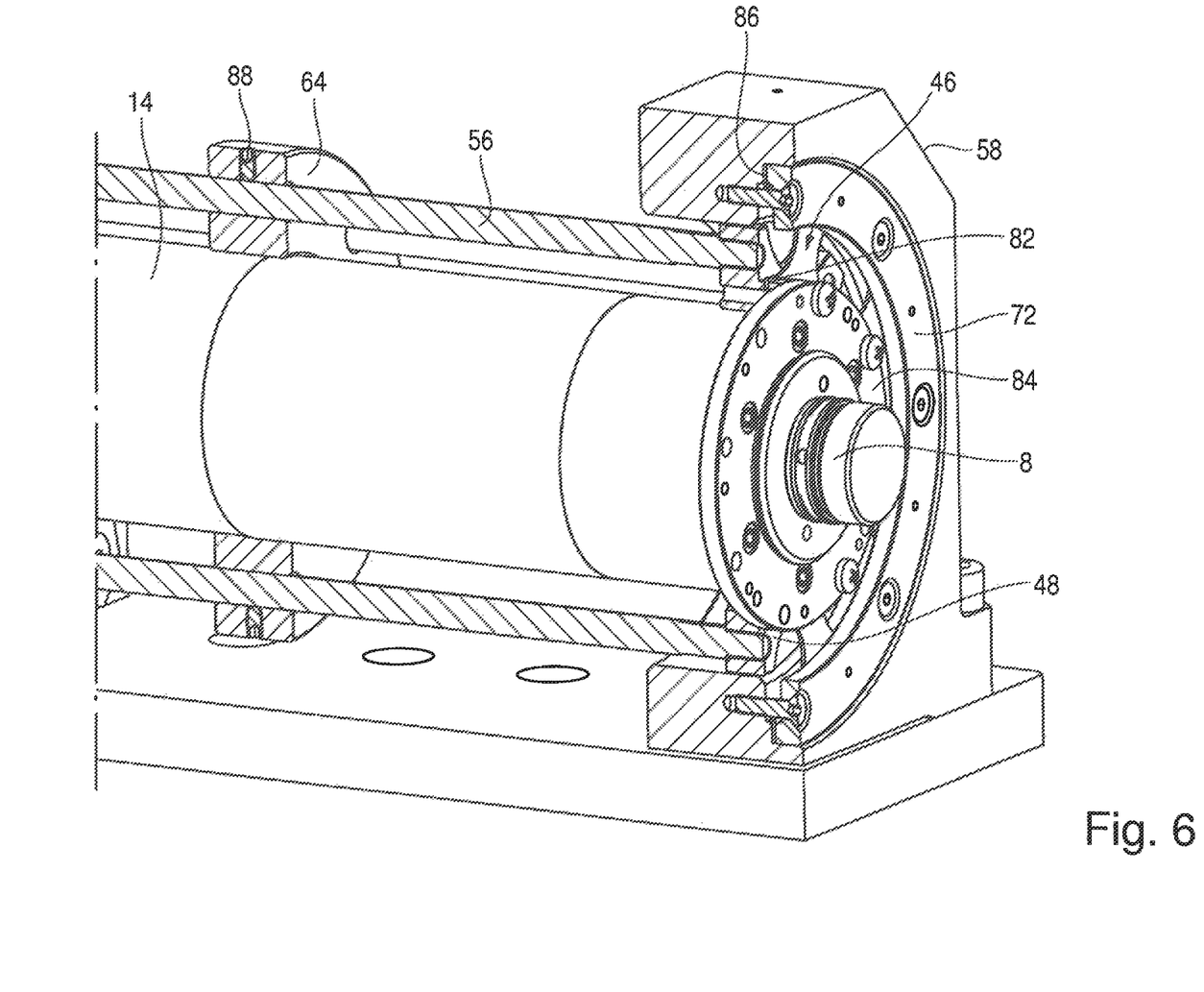
FIG. 6 a tool side bearing of the spindle arrangement.

FIG. 6 shows an enlarged illustration of the part of the spindle arrangement 1 formed in the region of the bearing bracket 58. This illustration clearly reveals the connection of the front flange 48 to the flange of the spindle housing 14 and the clamping of an inner ring 82 and the membrane bearing 46. An outer ring 86 of the membrane bearing 46 which has a roughly cup-shaped design is fixed to the bearing bracket 58 via the fastening ring 72, wherein the fastening ring 72 immerses into a corresponding back-step of the bearing bracket 58. The fastening of the other membrane bearings 10, 54 takes place correspondingly.

In accordance with the illustration in FIG. 6 the guide ring 64 encompasses the spindle housing 14 and is fixed to the transmission bars 56 by clamping screws 88, for instance, so that these are connected with each other. A connection of the guide ring 64 with the spindle housing 14 does not take place, so that the vibration is introduced directly into the tool side part of the housing 14.

Figure 7A:
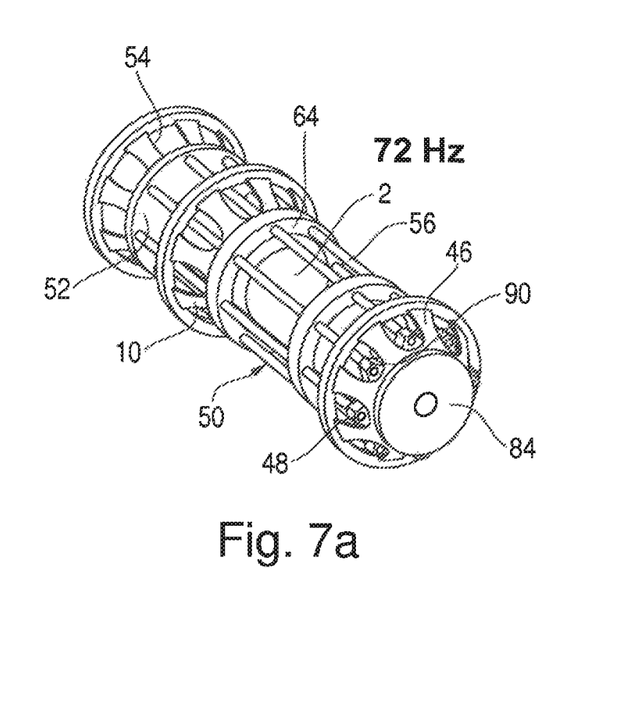
FIGS. 7a, 7b schematic diagrams of the spindle bearing with membrane bearings adapted differently with respect to resonance effects.
Figure 7B:
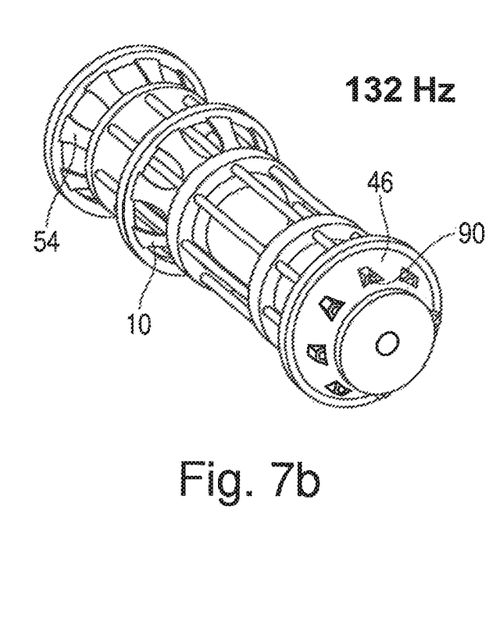

FIGS. 7a, 7b illustrate the basic structure of the vibration system with the spindle 2 which is excitable to vibrate in the z direction by the actuator (not illustrated here) and which is suspended/mounted by the two afore-described membrane bearings 10, 46. The transfer of vibration takes place by excitation of the actuator side flange 52 which is mounted via the membrane bearing 54. As explained, the vibrations are the introduced into the spindle 2 through the drive rods 50 and the front flange 48. In this embodiment the transmission bars 56 are connected with each other through two guide rings 64.

The vibration frequency of the spindle 2 lies in the range below 1000 Hz, wherein the natural frequency of the arrangement is utilized to support the excited vibration in the range of the natural frequency.

Thus, in the embodiment illustrated in FIG. 7a the three membrane bearings 10, 54, 46 are not of a continuous cup-shaped design, but are provided with a plurality of recesses 90, wherein the natural frequency of the membranes can be adjusted by a suitable geometry and size of the recesses 90 and the membrane strength. The embodiment illustrated in FIG. 7a has comparatively large-area recesses 90, so that the natural frequency of the structure is relatively low, for instance, in the range of 72 Hz. In the embodiment illustrated in FIG. 7b the recesses 90 of the membrane bearing 46 are distinctly reduced as compared to the embodiment pursuant to FIG. 7a, so that the natural frequency of the structure is higher, for instance, in the range of 132 Hz. In the variant pursuant to FIG. 7b the recesses of the other bearing membranes 10, 54 are unchanged. It is to be understood that the geometry of these membrane bearings can also be varied for adapting the natural frequency of the bearing system. In this manner it is possible, by a suitable design of the spindle suspension and the amplitude and the frequency of the actuator as well as the vibration mass of the compensation device 30, to set the vibration in the range of the natural frequency of the spindle arrangement 1, so that the energy for the vibration excitation is minimal.

Due to the compensation mass 32 vibrating equally-opposite, or due to corresponding compensation devices, the introducing of the vibrations into the machine structure is reliably prevented, so that the path accuracy is distinctly increased as compared to conventional solutions. Nevertheless, attention should be directed to the fact that process parameters are chosen during processing which do not cause an excitation of the machine structure in the natural frequency thereof.

The introduction of vibrations in all three main axis directions of the machine tool, which is possible in the embodiment of FIG. 1, permits to react in a flexible manner to the work pieces to be manufactured. Thus, it is for instance sufficient during drilling to introduce the vibrations merely along the Z axis (spindle longitudinal axis). Additionally, a vibration in the X and Y directions enables helical drilling. When milling a pocket or the like, however, a vibration in the X and Y directions is preferred, so that a trochoid processing takes place.

In the embodiment of FIG. 1 the vibration in the X and Y directions is integrated substantially in the region of the tool side bearing bracket 58. The use of an air bearing 12 in this region has the advantage of a low coefficient of friction and permits in addition a movement in the axial direction. The vibration in the Z direction is supported by the resonance frequency of the actuator side bearing support (membrane bearing 10).

The effects of a vibration superposition enable a more efficient supply of the cutting edges of the tool 6 with cooling lubricant, the washing out of chips, wherein the intermittent blade engagement with effectively higher sizes of cuts results in a significant improvement of the chipping process. Especially large vibration amplitudes in the range of more than 0.1 mm are to implement a clearance between the work piece and the blade, this causing a turbulent flowing of the cooling lubricant stream. This effect improves the cooling lubrication of the blade and reduces tool wearing. For instance when processing fiber composites, damage to the polymer matrix is obviated therewith.

Additionally, a significant improvement of the service life behavior of the tools can be observed. Such that, altogether, due to the improved chip breaking, the improved chip removal, the higher tool service life, the shortening of the manufacturing times, the shortening of the running times, and the resulting cost reduction, the productivity can be increased substantially.

Disclosed is a spindle arrangement comprising an actuator for exciting vibration of a tool carried by the spindle arrangement. By means of a compensation device active impulse compensation is performed.

LIST OF REFERENCE NUMBERS 1 spindle arrangement
2 spindle
4 tool holder
6 tool
8 rotor
10 membrane bearing
12 air bearing
14 spindle housing
16 fastening element
18 machine structure
20 actuator
22 piston
24 cylinder housing
26 pressure chamber
28 pressure chamber
30 compensation device
32 compensation mass
34 balance piston
36 pressure chamber
38 pressure chamber
40 differential bearing
42 housing
44 actuator
46 membrane bearing
48 front flange
50 drive rods
52 flange
54 further membrane bearing
56 transmission bar
58 bearing bracket
60 bearing bracket
62 enclosure
64 guide ring
66 spindle flange
68 fastening ring
70 fastening ring
72 fastening ring
76 fastening flange
78 fastening flange
80 piston rod
82 inner ring
84 clamping ring
86 outer ring
87 console
88 clamping screw
90 recess

The invention claimed is:
1. A spindle arrangement for a machine tool, the spindle arrangement comprising
a rotor configured to rotate a tool holder, the tool holder being configured to hold a tool,
at least one actuator configured to excite vibration of the tool, wherein the at least one actuator drives a compensation mass, a compensation device configured to at least partly compensate inertia forces produced by the vibration excitation in the rotor, a least one further actuator, and a further annular compensation mass configured to compensate radial vibrations that encompasses the rotor and is driven by the at least one further actuator that is diametrically arranged to the rotor axis.

2. The spindle arrangement according to claim 1, wherein the compensation device has the compensation mass driven equally-opposite to vibration transferred to the tool.

3. The spindle arrangement according to claim 1, wherein vibration masses of the rotor and of the compensation mass, a frequency, and a vibration amplitude are chosen such that counter-acting inertia forces substantially neutralize themselves.

4. The spindle arrangement according to claim 1, wherein a vibration frequency is less than 1 kHz.

5. The spindle arrangement according to claim 1, wherein the vibration excitation is performed via the at least one actuator or an actuator arrangement in one, two, or three axes (x, y, z).

6. The spindle arrangement according to claim 1, wherein the rotor is supported by two bearings enabling the vibration.

7. The spindle arrangement according to claim 6, comprising an additional bearing in a coupling region of the rotor.

8. The spindle arrangement according to claim 6, wherein the two bearings are air bearings or solid body elements.

9. The spindle arrangement according to claim 6, wherein the at least one actuator or an actuator arrangement and/or the compensation device are integrated in a spindle housing of the rotor.

10. The spindle arrangement according to claim 6, comprising drive rods configured to transfer vibration between the at least one actuator and the rotor.

11. The spindle arrangement according to claim 1, wherein the design of components excited to vibrate and a choice of vibration parameters are such that an entire spindle system vibrates at a defined natural frequency.

12. The spindle arrangement according to claim 1, wherein the at least one actuator is driven hydraulically, mechanically, or electromechanically.

13. The spindle arrangement according to claim 1, wherein a vibration amplitude lies in a range of 0.05 mm to 1 mm.

* * * * *